(12) United States Patent
Jain et al.

(10) Patent No.: US 12,450,274 B1
(45) Date of Patent: Oct. 21, 2025

(54) ADAPTIVE INFORMATION RETRIEVAL FOR MULTIMODAL DATA

(71) Applicant: INTUIT INC., Mountain View, CA (US)

(72) Inventors: Siddharth Jain, Mountain View, CA (US); Sivashanker Thiruchittampalam, Toronto (CA); Venkat Narayan Vedam, Mountain View, CA (US); Jonathan Lin, Toronto (CA)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/912,520

(22) Filed: Oct. 10, 2024

(51) Int. Cl.
  *G06F 16/334* (2025.01)
  *G06F 16/35* (2025.01)
(52) U.S. Cl.
  CPC .......... *G06F 16/3347* (2019.01); *G06F 16/35* (2019.01)
(58) Field of Classification Search
  CPC .............................. G06F 16/3347; G06F 16/35
  USPC ......................................................... 707/741
  See application file for complete search history.

(56) References Cited

U.S. PATENT DOCUMENTS

| | | | |
|---|---|---|---|
| 12,039,263 B1 * | 7/2024 | Mondlock | G06F 40/20 |
| 12,235,882 B1 * | 2/2025 | Chawla | G06F 16/285 |
| 12,253,973 B1 * | 3/2025 | Gavankar | G06F 16/152 |
| 2025/0117666 A1 * | 4/2025 | Brenner | G06N 3/091 |
| 2025/0131289 A1 * | 4/2025 | Larson | G06N 5/02 |
| 2025/0190460 A1 * | 6/2025 | Madisetti | G06F 40/284 |

OTHER PUBLICATIONS

Zhao, Xinyang, et al., "Chat2Data: An Interactive Data Analysis System with RAG, Vector Databases and LLM", Proc. of the VLDB Endowment, vol. 17, Issue 12, Aug. 1, 2024, pp. 4481-4484.*
Edwards, Candace, "Hybrid Context Retrieval Augmented Generation Pipeline: LLM-Augmented Knowledge Graphs and Vector Database for Accreditation Reporting Assistance", Univ. of Hawaii at Manoa, ICS 699: MS Plan B Capstone Report, archived at arXiv, Cornell Univ., May 24, 2024, pp. 1-41.*
Jing, Zhi, et al., "When Large Language Models Meet Vector Databases: A Survey", arXiv, Cornell Univ. archive document No. arXiv:2402.01763v2 [cs.DB], Feb. 6, 2024, pp. 1-9.*

(Continued)

*Primary Examiner* — Robert Stevens
(74) *Attorney, Agent, or Firm* — DLA PIPER LLP (US)

(57) ABSTRACT

At least one processor can generate a classification of a document including a plurality of sections according to at least one of a structure of at least one of the plurality of sections, a hierarchy of the plurality of sections, and a content of at least one of the plurality of sections. The at least one processor can determine a chunking strategy optimized for the classification from among a plurality of available chunking strategies, divide the document into a plurality of chunks according to the chunking strategy, and generate respective vector representations of respective ones of the plurality of chunks. At least one database can contain the vector representations and supply the vector representations to retrieval augmented generation (RAG) operations performed by at least one large language model (LLM).

20 Claims, 8 Drawing Sheets

(56) References Cited

OTHER PUBLICATIONS

Zhao, Siyun, et al., "Retrieval Augmented Generation (RAG) and Beyond: A Comprehensive Survey on How to Make Your LLMs use External Data More Wisely", arXiv, Cornell Univ. archive document No. arXiv:2409.14924v1 [cs. DB], Sep. 23, 2024, pp. 1-27.*
Zhong, Zijie, et al., "Mix-of-Granularity: Optimize the Chunking Granularity for Retrieval-Augmented Generation", arXiv, Cornell Univ. archive document No. arXiv:2406.00456v1 [cs.DB], Jun. 1, 2024, pp. 1-17.*
Wang, Xiaohua, et al., "Searching for Best Practices in Retrieval-Augmented Generation", arXiv, Cornell Univ. archive document No. arXiv:2407.01219v1 [cs.CL], Jul. 1, 2024, pp. 1-22.*
Gao, Yunfan, et al., "Retrieval-Augmented Generation for Large Language Models: A Survey", arXiv, Cornell Univ. archive document No. arXiv:2312.10997v4 [cs.CL], Jan. 5, 2024, pp. 1-26.*

* cited by examiner

ADAPTIVE INFORMATION RETRIEVAL FOR MULTIMODAL DATA

BACKGROUND

In today's data-driven landscape, information exists in diverse modalities including text, code, images, audio, and video. Existing information retrieval systems often struggle to effectively handle such multimodal data due to the lack of adaptive strategies and specialized models. As a non-limiting example, large language models (LLMs) may be configured to accept only a limited number of tokens for processing. When an LLM uses retrieval-augmented generation (RAG) to respond to queries, it ingests tokens. Chunking documents allows the LLM to be more targeted in its token retrieval, rather than wasting intake data on less relevant portions of a document, allowing a response to utilize more data and/or more relevant data. Existing approaches often rely on uniform chunking strategies and generic models, leading to suboptimal performance and limited applicability across diverse data types. As a result, users and systems encounter difficulties in retrieving relevant information across multiple modalities, hindering data retrieval, decision making, and knowledge discovery efforts.

BRIEF DESCRIPTIONS OF THE DRAWINGS

DETAILED DESCRIPTION OF SEVERAL EMBODIMENTS

Systems and methods described herein can provide a comprehensive framework for multimodal information retrieval, encompassing techniques such as vector creation, adaptive chunking, retrieval, aggregation, and/or result surfacing. The embodiments described herein can improve the technical process of information retrieval, realizing efficiency and efficacy gains in situations where the information includes multiple data formats. For example, data (e.g., individual documents or datasets) is often chunked into subsets, and the chunks are stored in storage elements such as vector databases, because chunked data can be more useful than large data for some computing use cases. The disclosed embodiments can adjust chunking techniques and subsequent retrieval techniques to best fit the modality of the data being processed. In turn, this enables improved RAG data for LLMs, allowing the LLMs to produce better responses to queries with fewer tokens taken as input.

To address the challenges of multimodal information retrieval, the systems and methods described herein can optimize chunking for a given data source, generating RAG-ready data that improves the efficiency and effectiveness of an LLM using RAG. For example, disclosed embodiments can perform vector creation through curation of high-quality datasets for each modality for machine learning (ML) model training and evaluation. The disclosed embodiments can optimize data chunking strategies using one or more of a variety of approaches that are tailored to the data modalities present in the data in question. Resulting chunks may be annotated with metadata, for example by LLM processing. Finally, during a retrieval operation, the disclosed embodiments can tailor search strategy and data aggregation based on the present data modalities and surface the results to users and/or other computing processes. As a result of the improved segmentation, chunking, and retrieval techniques described in detail below, the disclosed embodiments can provide results with high efficiency and accuracy.

Figure 1:
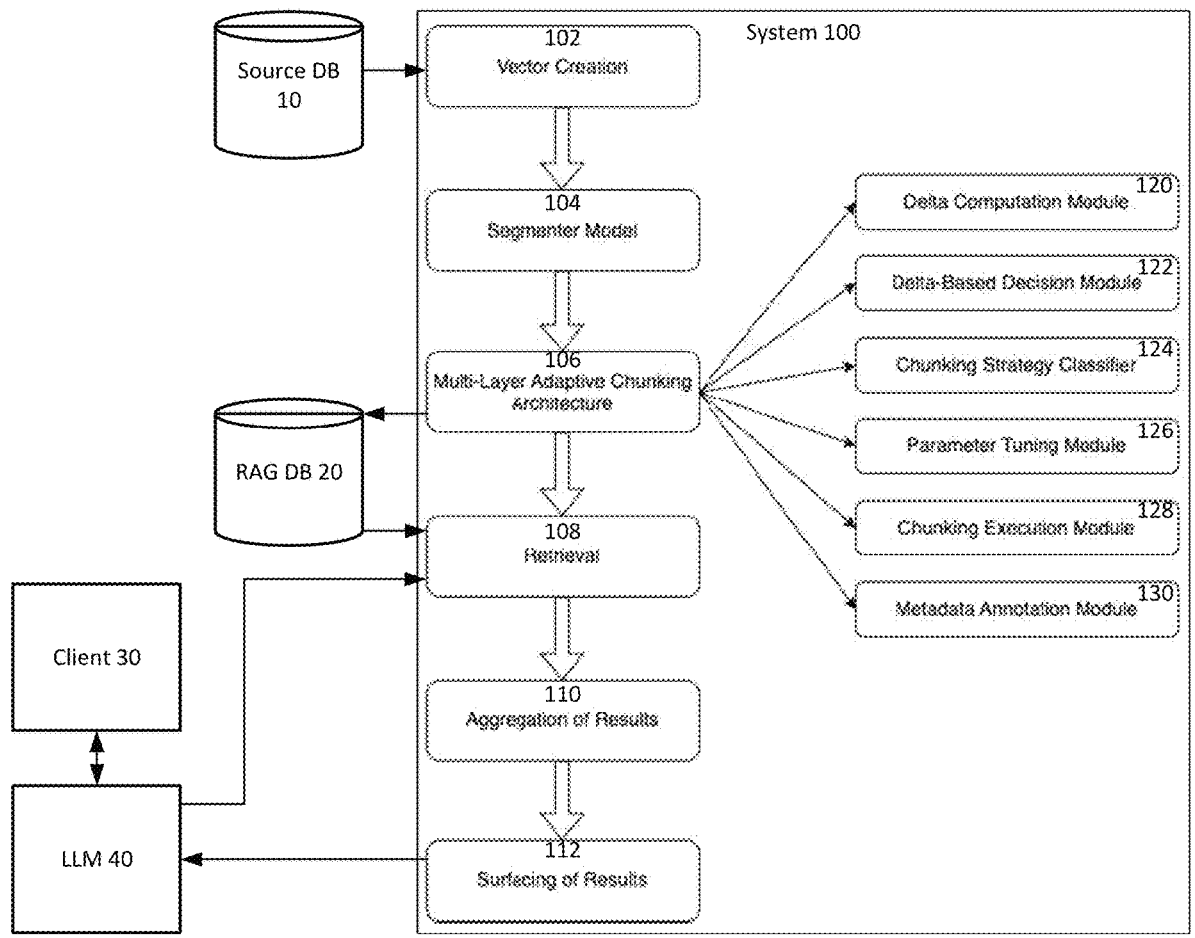
FIG. 1 shows an example adaptive data processing and retrieval system according to some embodiments of the disclosure.

FIG. 1 shows an example adaptive data processing and retrieval system 100 according to some embodiments of the disclosure. System 100 may include a variety of hardware, firmware, and/or software components that interact with one another and/or with external components, such as source database (DB) 10, RAG DB 20, client 30, and/or LLM 40. The components of system 100 can provide features and functions including, for example, vector creation 102, segmenter model 104, multi-layer adaptive chunking architecture 106 (which may itself include, for example, delta computation module 120, delta-based decision module 122, chunking strategy classifier 124, parameter tuning module 126, chunking execution module 128, and/or metadata annotation module 130), retrieval 108, results aggregation 110, and/or results surfacing 112. These elements are described in greater detail below, but in general, vector creation module 102, segmenter model 104, and multi-layer adaptive chunking architecture 106 process data from source DB 10 (and/or other source(s)) to thereby generate RAG-optimized data that can be stored in RAG DB 20 or otherwise made available for RAG operations. In response to a request for RAG data, for example from LLM 40 to respond to a prompt from client 30, retrieval 108, results aggregation 110, and results surfacing 112 can perform optimized RAG data searching in RAG DB 20 (and/or other source(s)), thereby providing optimized, high-quality RAG data allowing LLM 40 to provide a useful response.

As described in detail below, source DB 10 and RAG DB 20 are illustrated as separate elements and may function as such in some embodiments, while in other embodiments they may be provided by the same hardware and/or software. Also, while source DB 10, RAG DB 20, client 30, and LLM 40 are illustrated as external to system 100 and may function as such in some embodiments, in other embodiments they may be part of system 100. Some components within system 100 may communicate with one another using networks. Some components may communicate with external components, such as source DB 10, RAG DB 20, client 30, and/or LLM 40, through one or more networks (e.g., the Internet, an intranet, and/or one or more networks that provide a cloud environment) and/or by other modes of data transfer. Each component may be implemented by one or more computers (e.g., as described below with respect to FIG. 8).

As described in detail below, system 100 can perform processing to generate high-quality, high-performance RAG data and perform optimized retrieval of the RAG data responsive to LLM needs. For example, FIGS. 2-7 illustrate the functioning of the illustrated components in detail.

Elements illustrated in FIG. 1 (e.g., system 100 including any and/or all illustrated elements thereof), source DB 10, RAG DB 20, client 30, and/or LLM 40) are each depicted as single blocks for ease of illustration, but those of ordinary skill in the art will appreciate that these may be embodied in different forms for different implementations. For example, while source DB 10, RAG DB 20, client 30, LLM 40, and system 100 are depicted separately, any combination of these elements may be part of a combined hardware, firmware, and/or software element. Likewise, while various elements such as vector creation 102, segmenter model 104, multi-layer adaptive chunking architecture 106 (which may itself include, for example, delta computation module 120, delta-based decision module 122, chunking strategy classifier 124, parameter tuning module 126, chunking execution module 128, and/or metadata annotation module 130), retrieval 108, results aggregation 110, and/or results surfacing 112 are depicted as parts of a single system 100, any combination of these elements may be distributed among multiple logical and/or physical locations. Also, while one source DB 10, one RAG DB 20, one client 30, one LLM 40, and one system 100 are illustrated, this is for clarity only, and multiples of any of the above elements may be present. In practice, there may be single instances or multiples of any of the illustrated elements, and/or these elements may be combined or co-located.

In the following descriptions of how system 100 functions, several examples are presented. However, those of ordinary skill in the art will appreciate that these examples are merely for illustration, and system 100 and its methods of use and operation are extendable to other application and data contexts.

Figure 2:
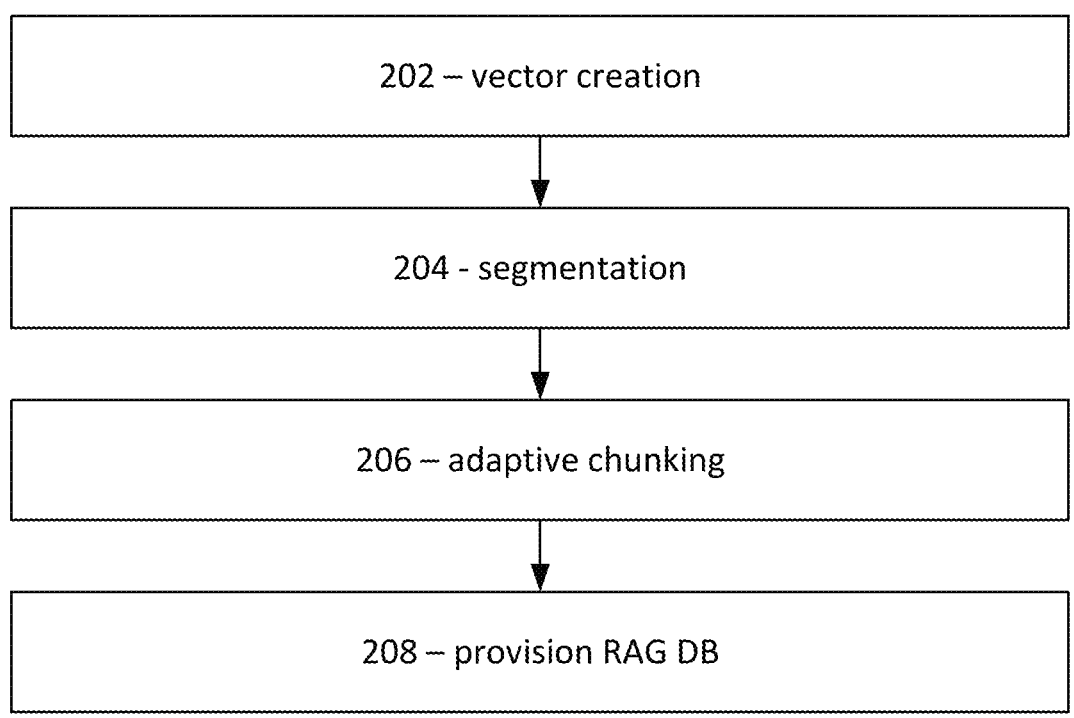
FIG. 2 shows an example adaptive RAG database provisioning process according to some embodiments of the disclosure.

FIG. 2 shows an example adaptive RAG database provisioning process 200 according to some embodiments of the disclosure. System 100 can perform process 200 to generate RAG optimized data from multimodal sources. Process 200 can produce data chunks that are both more efficiently processed and more coherent than standard chunking operations. Accordingly, process 200 can provide a technical solution of improving the efficacy and efficiency of RAG-based LLM operations and/or other data operations that can leverage chunked multimodal data. Details of process 200 are further illustrated in FIGS. 3-6, as discussed below.

At 202, system 100 can perform vector creation. Vector creation can produce a curated golden data set, or a plurality of golden data sets, that may be accessible by system 100 for subsequent processing, for example through a vector DB. Golden data can include high-quality data for each modality that can be found in documents being processed by system 100. For example, system 100 can create a golden data set for text, a golden data set for images, a golden data set for video, a golden data set for code, etc. As described in detail below, system 100 can use the golden data as benchmarks for model training and evaluation throughout process 200.

In some embodiments, golden data can be user-curated, and system 100 can convert the user-curated golden data into vector form and store the vectors. In some embodiments, a golden data set can include a plurality of question-and-answer pairs that can be used to evaluate chunking performance by system 100, as described below. Evaluation data can be structured as pairs of user query (question) and expected LLM response (answer). The golden data set(s) provisioned during vector creation can be used to evaluate the performance of the RAG data after process 200 has provisioned RAG DB 20, for example. As described in detail below, system 100 can tune process parameters to provide results that approach the golden data set answers for the same questions found in the golden data set.

Figure 3:
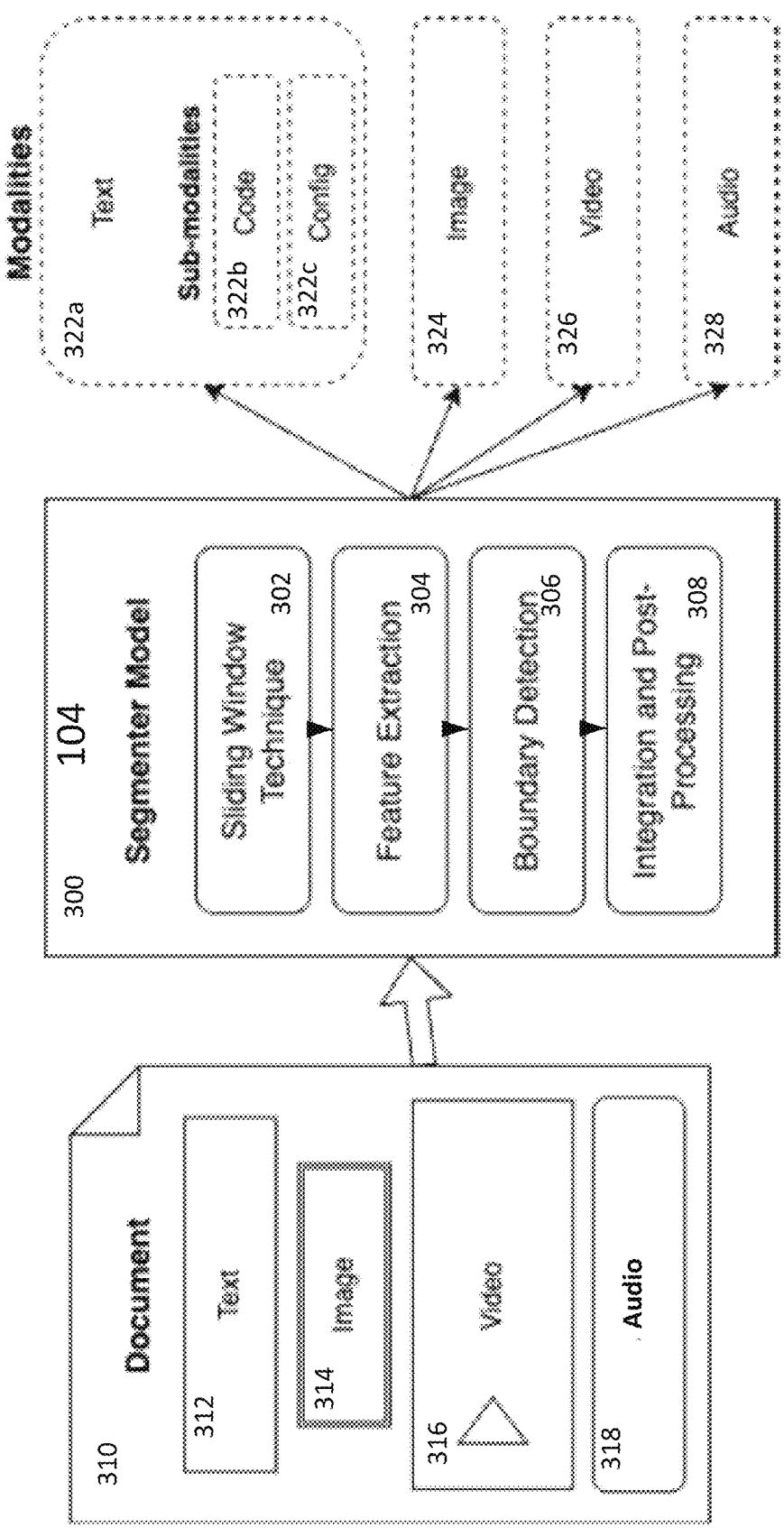
FIG. 3 shows an example data segmenting process according to some embodiments of the disclosure.

At 204, system 100 can perform segmentation. Segmentation can include determining a plurality of sections within a document and dividing the document according to those sections. System 100 can perform segmentation because documents being processed by system 100 are ultimately chunked according to a strategy tailored to the data modalities contained within the documents. Segmentation can divide a document into sections based on data modality. FIG. 3 illustrates segmentation in detail, but the process may be summarized as follows.

First, system 100 can receive a document (e.g., from source DB 10 or some other source), and the document can include a plurality of sections. These sections need not be explicitly labeled or defined, because system 100 can identify them through the segmentation process. System 100 can generate a classification of the document according to at least one of a structure of at least one of the plurality of sections, a hierarchy of the plurality of sections, and a content of at least one of the plurality of sections. As described below, system 100 can use a sliding window technique in some embodiments to identify a plurality of overlapping data slices within the document. System 100 can extract at least one data feature within each respective one of the plurality of data slices and/or detect at least one boundary between data types within the document according to the extracted at least one data feature, wherein the at least one boundary separates adjacent ones of the plurality of sections. In some embodiments, system 100 can identify the plurality of sections, which may include identifying at least one change within the document, where each at least one change can indicate the presence of respective adjacent sections of the document.

Figure 4:
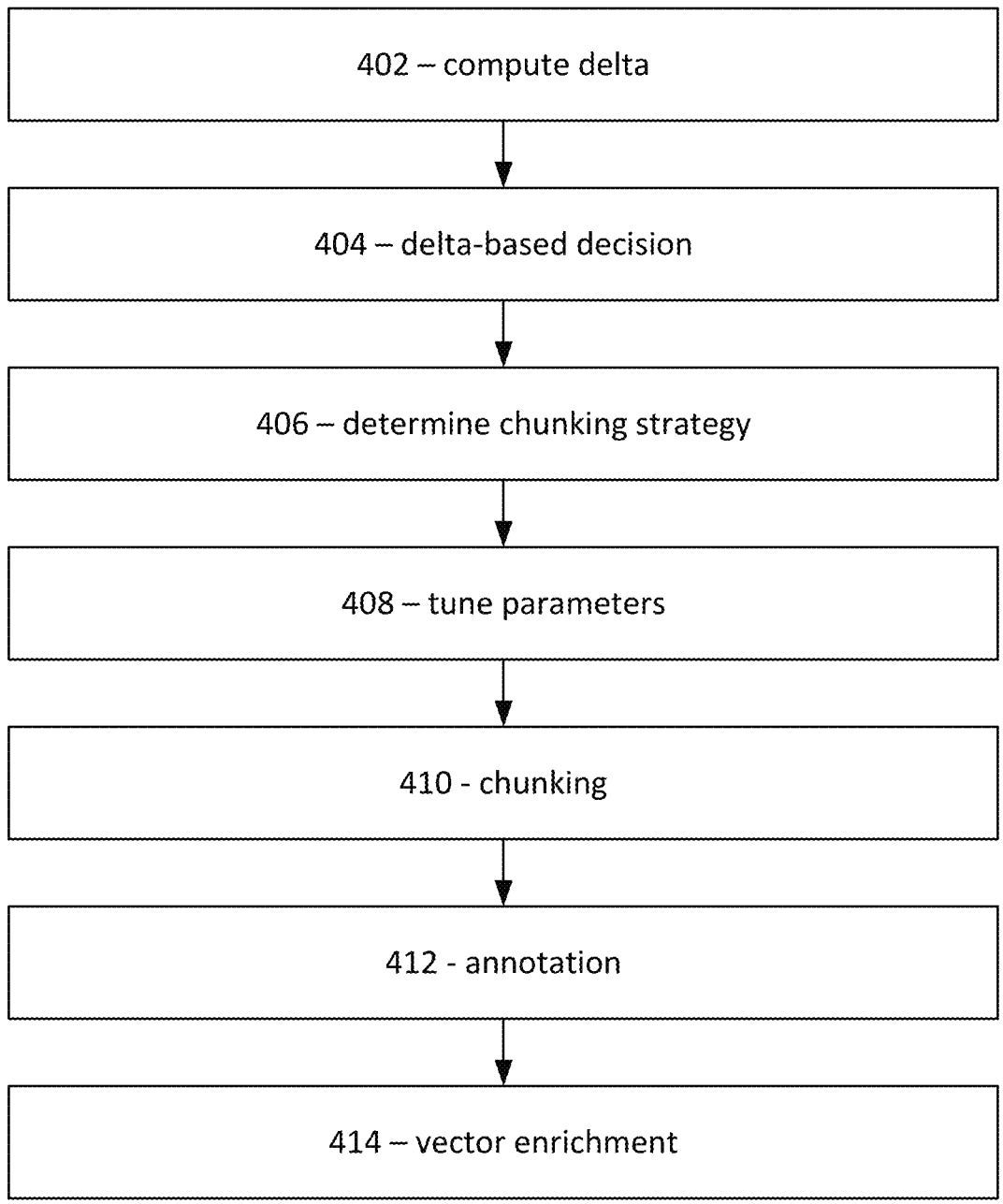
FIG. 4 shows an example adaptive data chunking and provisioning process according to some embodiments of the disclosure.
Figure 5:
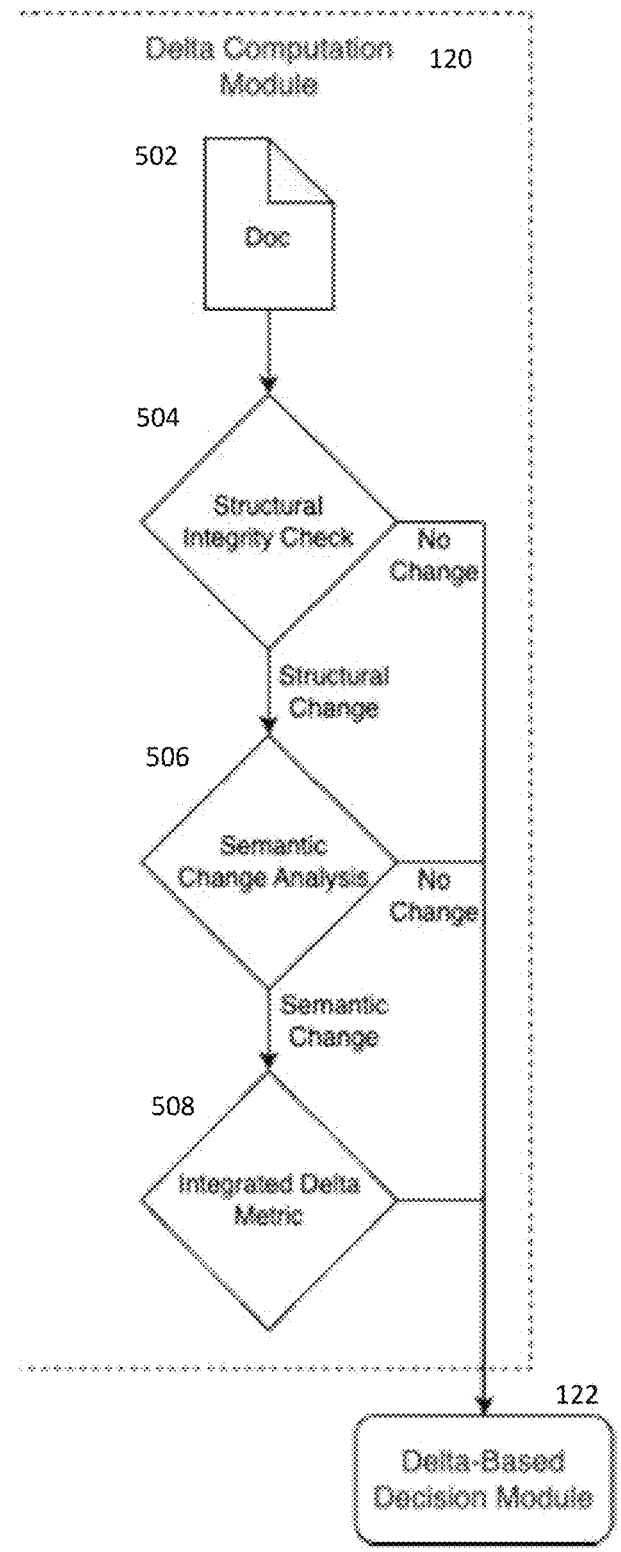
FIG. 5 shows an example delta computation process according to some embodiments of the disclosure.
Figure 6:
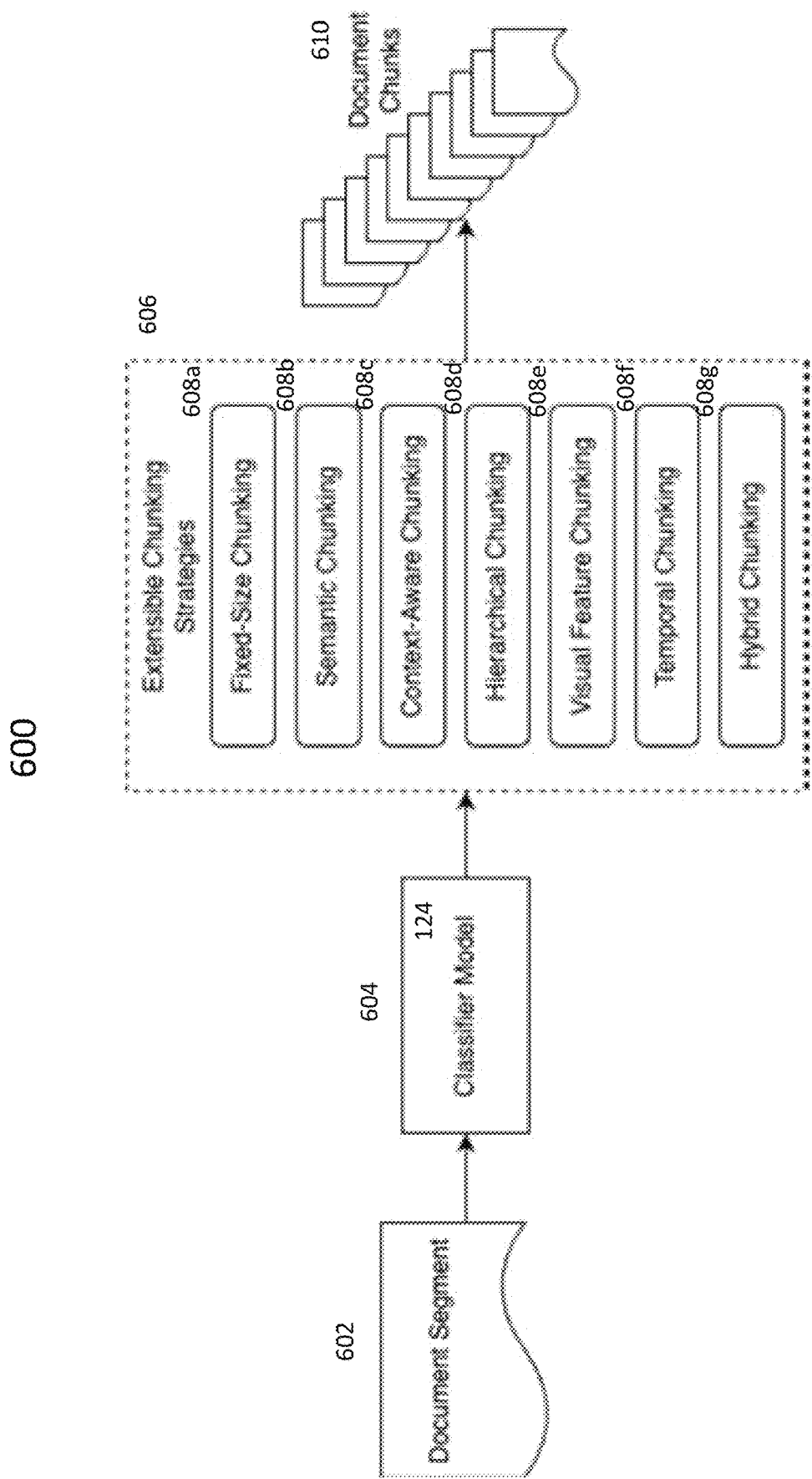
FIG. 6 shows an example adaptive data chunking process according to some embodiments of the disclosure.

At 206, system 100 can perform adaptive chunking. Adaptive chunking can include selecting an appropriate data chunking strategy and/or parameters depending on segmentation as determined at 204. In some embodiments, adaptive chunking can include dynamically adjusting chunking strategies and/or parameters based on changes detected between document versions. By performing adaptive chunking, system 100 can create highly optimized data chunks for RAG and/or other uses that are more useful and efficient than static, one size fits all chunking approaches. FIGS. 4-6 illustrate adaptive chunking in detail, but the process may be summarized as follows.

System 100 can determine a chunking strategy optimized for the classification determined at 204 from among a plurality of available chunking strategies and segment the document into a plurality of chunks according to the chunking strategy. In some embodiments, the determining can include selecting, as the chunking strategy, a strategy optimized for the at least one data feature or combination of two or more data features from among the plurality of available chunking strategies.

In some embodiments, adaptive chunking can include determining that the document has changed compared with a previously-classified version of the document, determining a category of change for the document, and selecting a processing action for the document according to the category of change. Processing actions can include, for example, reclassifying the document in response to the category of change indicating a new section in the document, tuning a parameter of the chunking strategy in response to the category of change indicating a change at or below a threshold level, and/or changing the chunking strategy to a different one of the plurality of available chunking strategies in response to the category of change indicating a change above the threshold level.

At 208, system 100 can provision RAG DB 20, wherein RAG DB 20 can be configured to supply contents thereof to RAG operations performed by LLM 40. For example, system 100 can generate respective vector representations of respective ones of the plurality of chunks and provision RAG DB 20 with the vector representations, thereby making the vector representations available to LLM 40 during RAG operations. In some embodiments, system 100 can annotate at least one of the plurality of chunks. Annotating may include, for example, generating at least one metadata tag according to the classification as an annotation and/or prompting LLM 40 (or another LLM) with content of the at least one of the plurality of chunks and including at least a portion of an LLM response in an annotation. In some embodiments, generating the respective vector representations can include enriching the respective vector representations to include at least one of domain-specific data, semantic data, structural data, and contextual data related to the classification.

In some embodiments, system 100 can create the vector representations. For example, system 100 can utilize embedding models like BERT, GPT, or domain-specific embeddings to generate dense vector representations for each modality. For example, system 100 can input a chunk to the embedding model and receive an encoded vector representation as output from the embedding model. System 100 may perform this process for each chunk generated at 206 for a given document. The resulting vector representations can encode semantic, structural, and contextual information inherent in text, code, images, audio, and video data, thereby encapsulating domain-specific features and nuances to enable accurate retrieval across diverse data sources.

FIG. 3 shows an example data segmenting process 300 according to some embodiments of the disclosure. Segmenter model 104 can perform process 300 to dissect a document 310 into clearly delineated modal elements 322*a*-328, enabling distinct handling of text and/or code 312, images 314, video 316, and/or audio 318 within a single document 310. Process 300 may leverage a dynamic sliding window technique paired with boundary detection algorithms to ascertain precise segment borders across varying data types, ensuring robust scalability for diverse content.

At 302, segmenter model 104 can traverse document 100 using a sliding window technique, where the document is sampled by capturing overlapping sequential windows covering the document from start to end. Segmenter model 104 can move the window across the document to systematically capture overlapping data slices, facilitating comprehensive coverage and analysis. The sliding window can span across multiple modalities when slicing the document. Segmenter model 104 may dynamically adjust the window size to suit the document type. For example, assume a document contains text 312, images 314, video 316, and/or audio 318. Different types of documents may be arranged differently, even if they all contain these same content elements. For example, a wiki page and a stack overflow post may be arranged differently. Segmenter model 104 can tune the window size for documents having known or expected arrangements to ensure accuracy in subsequent processing such as feature extraction.

At 304, segmenter model 104 can perform feature extraction. Different modalities have different feature distributions, so segmenter model 104 can use one or more algorithms that identify feature distributions. Segmenter model 104 can identify changes in feature distributions as changes in modality. For example, segmenter model 104 can process each segment using a natural language processing (NLP) algorithm or generative AI LLM (e.g., GPT4, Llama3, etc.) to identify text 312 and derive semantic and syntactic information for text 312. Segmenter module 104 can perform lexical analysis on text 312 to capture structural patterns indicative of code. Segmenter module 104 can use one or more convolutional neural networks (CNNs) to extract distinguishing visual characteristics identifying images 314. Segmenter module 104 can use mel frequency cepstral coefficients (MFCCs) and/or extract frame-based characteristics to capture temporal and spatial dynamics indicative of video 316 and/or audio 318. By applying these algorithms to the segments, and/or other proprietary or known algorithms configured to detect features, segmenter model 104 can determine the features that are present within each segment, such as text 312 (including code), images 314, video 316, and/or audio 318.

At 306, segmenter model 104 can perform boundary detection. The transition between different modalities and submodalities (types of text like semantic text or code) can be identified by analyzing feature distributions. Segmenter model 104 can use Bayesian Online Changepoint Detection or other algorithms to detect statistically significant shifts in data characteristics (e.g., above a threshold value for characteristic differences), marking potential boundaries. Segmenter model 104 can label any such potential boundary as a boundary between types of modalities within a segment. Thus, segmenter model 104 can identify modalities such as text 322*a* (including subsets thereof such as code 322*b* or semantic text 322*c* such as that describing code configuration), image(s) 324, video 326, and/or audio 328.

At 308, segmenter model 104 can perform integration and post-processing. For example, segmenter model 104 can refine identified segments to ensure logical continuity and coherence, merging closely related segments (e.g., where adjacent segments have the same kind of modalities within, and are different from other nearby segments) and/or adjusting boundaries (e.g., adding overlap to adjacent segments to ensure context is maintained from segment to segment) to enhance the accuracy of the segmentation.

FIG. 4 shows an example adaptive data chunking and provisioning process 400 according to some embodiments of the disclosure. Multi-layer adaptive chunking architecture 106 can perform process 400 to determine an appropriate chunking strategy for a document (e.g., a document that has been segmented according to process 300) and generate data chunks using the strategy. Process 400 can select chunking strategies that generate the most efficient and meaningful chunks for RAG and/or other uses and can dynamically adjust chunking strategies and parameters to adapt to changes detected between document versions and/or within documents.

At 402, multi-layer adaptive chunking architecture 106 may determine a delta between a current version of the document being analyzed and a previous version of the same document, if there is a previous version available. FIG. 5 shows an example delta computation process 500 according to some embodiments of the disclosure. Delta computation module 120 can compute the delta between the current document (Dcurrent) and past document (Dpast) across different modalities. As outputs, delta computation module 120 may provide delta values ($\Delta$) representing both structural and semantic changes. To start the determination, at 502, delta computation module 120 can receive Dcurrent and Dpast.

At 504, delta computation module 120 may perform a structural integrity check on the document, for example using a hashing procedure. In some embodiments, for each segment in both Dcurrent and Dpast, delta computation module 120 can generate a hash using a cryptographic hash function, which may ensure sensitivity to even minor changes. Delta computation module 120 can define a binary hash difference HashDiff(i) for each segment, for example as follows:

$$HashDiff_i = \begin{cases} 0 & \text{if } \text{hash}(D_{current,i}) = \text{hash}(D_{past,i}) \\ 1 & \text{otherwise} \end{cases}$$

This binary outcome can indicate whether there has been any change in the segment's structural integrity.

At 506, delta computation module 120 may perform a semantic change analysis on the document. For example, delta computation module 120 can apply a known or proprietary embedding model to both Dcurrent and Dpast to calculate semantic change. The embedding model may provide vector representations of the respective versions, according to modality, from which delta computation module 120 can determine a level of semantic change.

For example, delta computation module 120 can apply contextual embeddings to compute vector representations for text segments in Dcurrent and Dpast. For non-textual data (e.g., images, audio, and/or video), delta computation module 120 can use appropriate feature extraction models to generate embeddings. For example, delta computation module 120 can use CNNs to generate image embeddings and/or use MFCCs to generate video and/or audio embeddings.

Delta computation module 120 can calculate the Euclidean distance between the embeddings of corresponding segments to measure semantic shifts, for example as follows:

$$SemanticDiff_i = \sqrt{\sum (v_{current,i} - v_{past,i})^2}$$

where $v_{current,i}$ and $v_{past,i}$ represent the embedding vectors of the current and past segments respectively.

At 508, delta computation module 120 may generate an integrated delta metric by combining the binary hash difference and the continuous semantic difference into a single data metric, for example as follows:

$$\Delta_i = w_1 \times HashDiff_i + w_2 \times SemanticDiff_i$$

where $w_1$ and $w_2$ are weighting factors that adjust the importance of structural versus semantic changes. These weights can be dynamically adjusted based on the modality and the document's sensitivity to changes. For example, weights can be determined by performing process 500 using the golden data set and comparing the results of process 500 with the known changes from the golden data set.

Process 500 may provide a granular analysis of changes, effectively capturing both overt and subtle shifts in document content across different modalities. The delta computation is sensitive to the specific characteristics of each data type, enabling delta-based decision making as described in detail below. As output, process 500 can provide $\Delta_i$ for each segment by the above techniques, and subsequent actions in process 400 can use $\Delta_i$ as follows.

Returning to FIG. 4, at 404, multi-layer adaptive chunking architecture 106 may make a decision on chunking strategy based on the delta calculated at 402 ($\Delta_i$). For example, in cases where a previous version of the document exits, multi-layer adaptive chunking architecture 106 may have previously determined a chunking strategy for that document during a previous iteration of process 400. At this stage, delta-based decision module 122 may determine whether the strategy should change according to the delta.

Delta-based decision module 122 can ensure that system 100 can adapt to changes in a document efficiently. By analyzing the computed deltas for each segment, delta-based decision module 122 can determine the appropriate action to take. Delta-based decision module 122 can balance exploration and exploitation by deciding whether to follow earlier chunking strategies (if available), classify new segments, tune parameters for minor changes, or switch chunking strategies for significant changes. This approach ensures that system 100 remains robust and adaptive, continuously improving its performance based on the evolving characteristics of the data.

For example, to determine the action (e.g., classify, tune parameters, or switch strategy) based on the delta value ($\Delta$), for each segment, delta-based decision module 122 can identify the delta value and proceed according to the following logic in some embodiments:

If $\Delta_i \leq \delta$ (new segment): Classify and set initial parameters (e.g. using Bayes Theorem based on historical evidence of prior knowledge).

If $\delta 0 < \Delta_i \leq \delta 1$ (minor change): Tune parameters (exploitation) to improve performance of the already-valid chunking strategy. Parameter tuning may be performed by parameter tuning module 126 as described below.

If $\Delta_i > \delta 1$ (significant change): Switch chunking strategy (exploration), which may identify a chunking strategy that can perform better than the current chunking strategy. Chunking strategy exploration may be performed by chunking strategy classifier module 124 as described below.

Thresholds ($\delta 0$, $\delta 1$) may be tunable and may be auto-tuned based on the golden data set. Depending on the modalities present in the document, the multi-layer architecture may have different delta values (e.g., different thresholds may be used for text, video, audio, image, etc.).

At 406, multi-layer adaptive chunking architecture 106 may determine a chunking strategy for the document. If delta-based decisioning has been performed due to the existence of a past version of the document, the decision determined at 404 may be used. Alternatively, or additionally, multi-layer adaptive chunking architecture 106 may classify the segment(s) and select one or more chunking strategies according to the classification(s). In either case, multi-layer adaptive chunking architecture 106 may apply the one or more chunking strategies and generate data chunks.

FIG. 6 shows an example adaptive data chunking process 600 according to some embodiments of the disclosure. System 100 can perform process 600 on each document segment that has been generated and processed as described above. By performing process 600, system 100 can classify a document segment to determine the optimal chunking strategy based on the content, structure, and hierarchy of the document segment. Once the document segment is classified, system 100 can apply the optimal chunking strategy to create document chunks 610.

At 602, multi-layer adaptive chunking architecture 106 can receive a document segment for processing. In the following example, multi-layer adaptive chunking architecture 106 is processing a single document segment, but it will be understood that process 600 can be repeated until all segments in a document have been chunked. Additionally, in some embodiments multiple iterations of process 600 may be performed concurrently to process document segments in parallel, and in some embodiments process 600 may be repeated sequentially for serial processing of respective document segments.

At 604, multi-layer adaptive chunking architecture 106 can determine a chunking strategy. For newly-encountered segments or segments for which delta-based decisioning has determined a strategy change should be applied, chunking strategy classifier module 124 of multi-layer adaptive chunking architecture 106 can analyze the content and structure of the segment received at 602 to select an optimal chunking strategy for the segment. For example, system 100 can store a plurality of chunking strategies. The chunking strategies may be extensible such that chunking strategy options may be added to or removed from system 100. For example, the embodiment of FIG. 6 includes seven chunking strategies: fixed-size chunking 608a, semantic chunking 608b, context-aware chunking 608c, hierarchical chunking 608d, visual feature chunking 608e, temporal chunking 608f, and hybrid chunking 608g. It should be understood that the illustrated set of chunking strategies is not exhaustive for all embodiments, and chunking strategies may be added or removed.

Chunking strategy classifier module 124 may be configured to select an extensible chunking strategy for the segment according to properties of the segment. In some embodiments, fixed-sized chunking 608a, which divides the input into equal-sized chunks, may be a default strategy, although it should be noted that the chunking strategy classification being performed within process 600 can provide a technical advantage of selecting a strategy other than the default strategy. Semantic chunking 608b can divide the input according to semantic content, such as sentences or paragraphs, and may be selected for segments having largely text content organized semantically as determined by LLM or NLP in process 300, as described above. Context-aware chunking 608c can divide the input according to contextual clues such as code breaks in code sections as identified by lexical analysis in process 300, as described above. Hierarchical chunking 608d can divide the input according to hierarchical structures, including sections and/or subsections such as nested elements in XML or HTML documents, as identified by lexical analysis in process 300, as described above. Visual feature chunking 608e can divide the input according to visual features and spatial relationships within images as detected by CNN feature extractions in process 300, as described above. Temporal chunking 608f can divide the input according to temporal patterns and events within audio and video as detected by one or more known or proprietary Python libraries configured to split audio by sentence or video by scene in process 300, as described above. Hybrid chunking 608g can include multiple strategies from among the other extensible strategies 608a-608f for inputs having multiple modalities within (e.g., combine semantic chunking 608b and visual feature chunking 608e for a webpage with text and images together). At 606, multi-layer adaptive chunking architecture 106 can select the chunking strategy as determined at 604 for segments requiring such selection.

Returning to FIG. 4, at 408, multi-layer adaptive chunking architecture 106 may tune parameters. For example, for segments for which delta-based decisioning has determined only minor changes are present, and a new chunking strategy need not be selected, parameter tuning module 126 of multi-layer adaptive chunking architecture 106 can optimize the parameters of the applicable chunking strategy. Starting from the current segment Dcurrent and initial chunking parameters (e.g., those used to produce Dpast), parameter tuning module 126 can apply one or more genetic algorithms, Bayesian optimization, or golden datasets to fine-tune parameters like chunk size and overlap, for example as follows. Mathematically, let $\theta$ represent the chunking parameters (e.g., chunk size). The optimization problem can be formulated as:

$$\theta_{optimized} = \text{argmax}_\theta \text{PerformanceMetric}(D_{current}, \theta)$$

$\theta$: set of parameters to be optimized (chunk size, overlap etc)

PerformanceMetric($D_{current}$, $\theta$): function that evaluates performance of chunking strategy to the current document, with parameter set $\theta$ argmax$_\theta$: finding parameter set 0 to maximize per formace metric For example, assume an initial chunk size of 1000 characters. Parameter tuning module 126 may adjust chunk size for optimal performance based on document content and context. After tuning, the chunk size may be adjusted to 1200 characters to better capture the content structure.

At 410, multi-layer adaptive chunking architecture 106 may perform chunking. For example, chunking execution module 128 of multi-layer adaptive chunking architecture 106 can divide the document and/or segments thereof into chunks 610 using the strategy determined at 406 and/or tuned at 408.

At 412, multi-layer adaptive chunking architecture 106 may annotate chunks with relevant metadata based on the document's hierarchical position, context, and/or content. For example, metadata annotation module 130 of multi-layer adaptive chunking architecture 106 can receive the document chunks from 410 and additional data such as document context and/or hierarchical position. Metadata annotation module 130 can annotate the chunks with metadata tags derived from the additional data. Tags may include data for search and aggregation purposes, such as topic, keywords, section titles, and/or other relevant descriptors.

For example, document context data can include details about the document's purpose, audience, and/or other relevant background information. Document hierarchical position can include information about the document's position within the structure of a repository or system. Any of this information may be included within the document as existing metadata of the document itself. In some embodiments, metadata annotation module 130 can extract the metadata from the document for annotation of the chunks. Metadata annotation module 130 can add descriptive information from the document file to the metadata, such as file name, file properties, etc. For documents having a source location, such as web pages, wiki pages, etc., metadata annotation module 130 can include the location in the metadata. Metadata annotation module 130 can create tags and/or key value pairs as prefilters for a vector database (e.g., RAG DB 20) semantic search.

In some embodiments, metadata annotation module 130 can use an LLM such as GPT-4, Gemini, or others to generate metadata tags. Metadata annotation module 130 can prompt the LLM to consider the document's content, context, and hierarchical structure to generate relevant metadata tags.

At 414, multi-layer adaptive chunking architecture 106 may generate and enrich vector representations of the chunks as produced at 410. For example, multi-layer adaptive chunking architecture 106 may generate vector representations using any known or novel vector algorithm configured to prepare data for storage according to any known or novel vector DB schema. Multi-layer adaptive chunking architecture 106 may use a vector algorithm compatible with RAG DB 20. In some embodiments, generating the respective vector representations can include enriching the respective vector representations to include at least one of domain-specific data, semantic data, structural data, and contextual data related to the classification. For example, multi-layer adaptive chunking architecture 106 may enrich the vector representations by adding metadata tags as generated at 412. Multi-layer adaptive chunking architecture 106 may store the resulting vectors in RAG DB 20.

Figure 7:
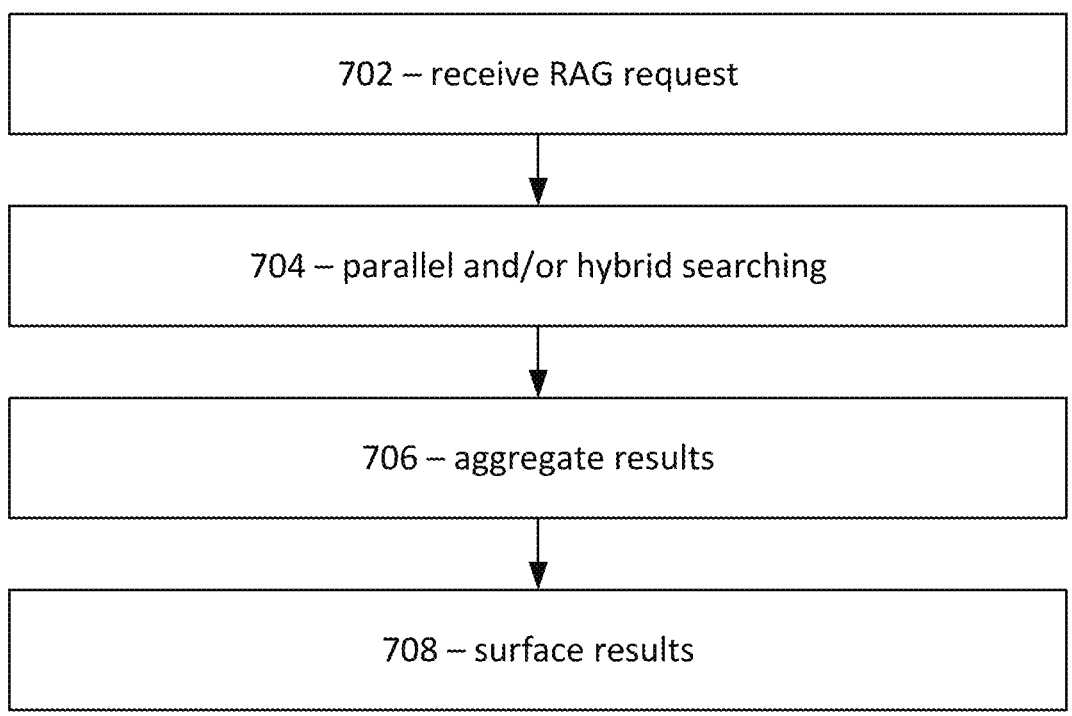
FIG. 7 shows an example retrieval process according to some embodiments of the disclosure.

FIG. 7 shows an example retrieval process 700 according to some embodiments of the disclosure. System 100, for example retrieval 108, aggregation 110, and/or surfacing 112 modules, can perform process 700 to respond to requests by LLM 40 and/or client 30 for RAG data such as that generated as described above by process 400.

At 702, retrieval module 108 can receive a RAG request. This request for RAG data may come from at least one of LLM 40 and/or a computing device preparing a prompt for LLM 40, such as client 30. The request can include an LLM prompt and/or data describing the content of the LLM prompt, for example.

At 704, retrieval module 108 can perform parallel and/or hybrid searching of RAG DB 20 in response to the request received at 702 and thereby retrieve a plurality of vector representations from RAG DB 20. Parallel and/or hybrid searching can include executing a plurality of search strategies corresponding to a plurality of data types present in at least one document represented by the plurality of vector representations. For example, hybrid search can be a mix of semantic and lexical search using a K-nearest neighbors search algorithm or other known or proprietary search algorithm. In some embodiments, the search can be semantic but also can include search terms for metadata added as described above (e.g., image from a stack overflow document about Kubernetes monitoring, or any other specific location or document type metadata search terms). In some embodiments, as a check, retrieval module 108 can determine whether the results received align with the golden data set in some embodiments using any known or proprietary algorithmic matching technique to match the embedding vectors from the results with the golden data set.

At 706, aggregation module 110 can aggregate results received from RAG DB 20 in response to the searching performed at 704. For example, aggregation module 110 can generate a response that includes all, or a subset, of the results retrieved from RAG DB 20 at 704. In some embodiments, the results can be ranked or otherwise ordered, for example in order of how closely a result has been found to match the golden data set. In some embodiments, aggregation module 110 can aggregate results from parallel searches across different modalities by leveraging metadata attributes such as domain, topic, or content type. For example, aggregation module 110 can employ one or more of the following aggregation algorithms.

Aggregation module 110 can use fusion algorithms can be used to integrate results from multiple modalities based on their relevance and the metadata attributes. This can be formalized as a weighted sum where each result's weight is determined by its relevance score and the importance of its metadata.

$$R = \sum_{i=1}^{n} w_i \cdot r_i$$

Where R is the aggregated result, $r_i$ represents individual results from different modalities, and $w_i$ represents the weights assigned based on the metadata attributes (domain, topic, content) and the relevance of the results.

Aggregation module 110 can use ensemble techniques that can involve combining results from different modalities to enhance the robustness and accuracy of the aggregated input. This can be represented using an averaging methodology depending on the nature of data.

$$R_{ensemble} = \frac{1}{n} \sum_{i=1}^{n} R_i$$

Where $R_{ensemble}$ is the result after applying averaging method, and $R_i$ are results from different searches or modalities.

Aggregation module 110 can use intersection and re-run approaches to identify overlapping results across different modalities, prioritizing highly relevant information. This can be expressed through the intersection of result sets, prioritizing results that appear across multiple searches.

$$R_{intersection} = \bigcap_{i=1}^{n} S_i$$

Where $R_{intersection}$ represents intersection of result sets, and $S_i$ are the sets of results from different modalities or searches. Aggregation module 110 can dynamically re-run hybrid searches based on user feedback, contextual changes, or evolving search criteria to refine and update the retrieved results. Aggregation module 110 can incorporate feedback loops to iteratively improve search accuracy and adapt to evolving user preferences and information needs.

Aggregation module 110 can use Jaccard similarity metrics to quantify the similarity between sets of retrieved results based on shared content-related metadata attributes. For example, aggregation module 110 can calculate Jaccard similarity coefficients to identify commonalities and relationships between retrieved items, facilitating efficient union/intersection operations. Aggregation module 110 can integrate Jaccard-based ranking mechanisms to prioritize results with high similarity scores, enhancing result relevance and coherence.

At 708, surfacing module 112 can surface the results as aggregated at 706. Surfacing the results can include responding to the request received at 702 by sending the at least one of the vector representations as aggregated to at least one of the LLM 40 and/or the computing device preparing the prompt for LLM 40 (e.g., client 30).

Figure 8:
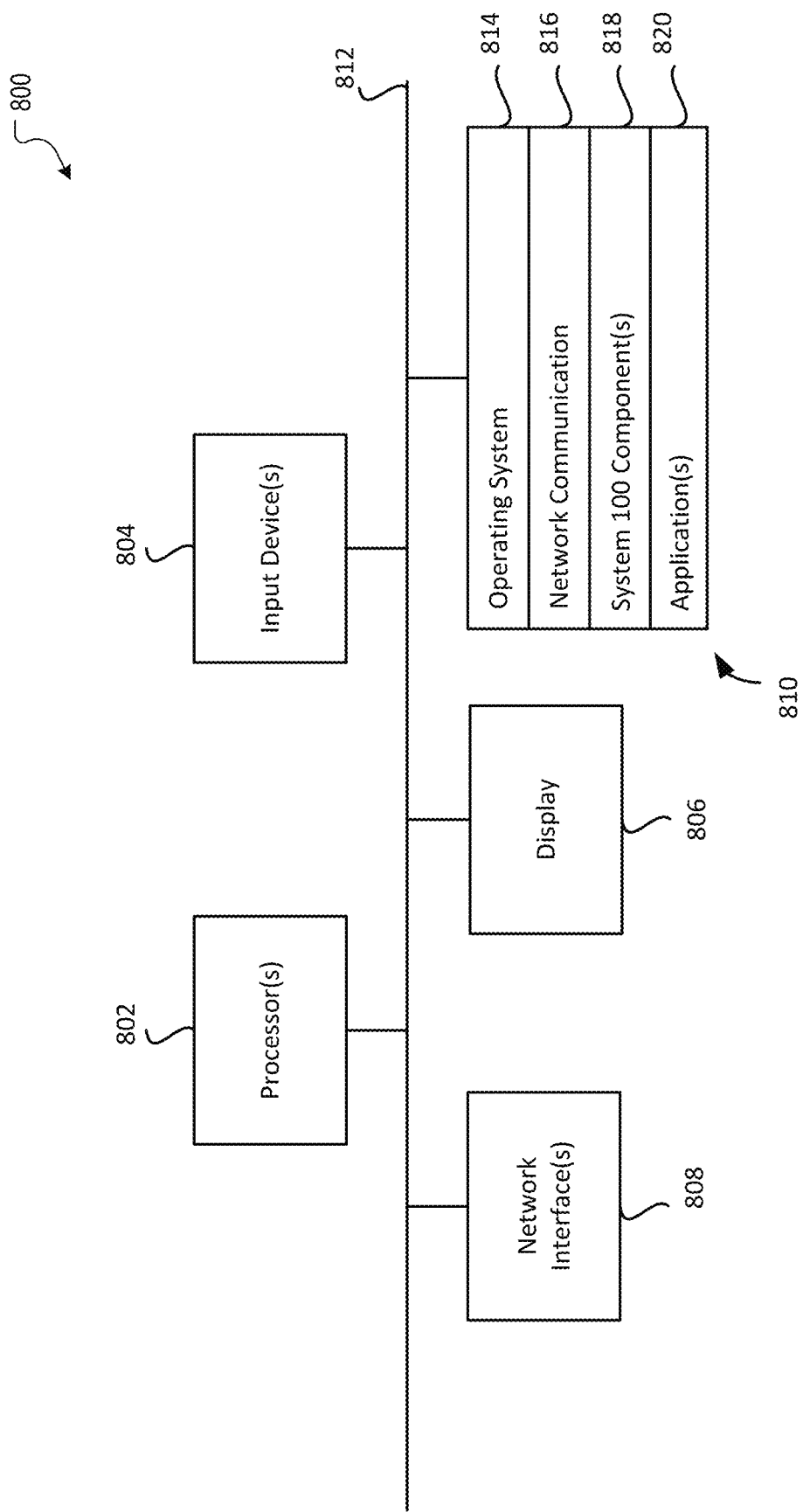
FIG. 8 shows a computing device according to some embodiments of the disclosure.

FIG. 8 shows a computing device 800 according to some embodiments of the disclosure. For example, computing device 800 may function as system 100 or any portion(s) thereof, or multiple computing devices 800 may function as system 100.

Computing device 800 may be implemented on any electronic device that runs software applications derived from compiled instructions, including without limitation personal computers, servers, smart phones, media players, electronic tablets, game consoles, email devices, etc. In some implementations, computing device 800 may include one or more processors 802, one or more input devices 804, one or more display devices 806, one or more network interfaces 808, and one or more computer-readable mediums 810. Each of these components may be coupled by bus 812, and in some embodiments, these components may be distributed among multiple physical locations and coupled by a network.

Display device 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device 804 may be any known input device technology, including but not limited to a keyboard (including a virtual keyboard), mouse, track ball, and touch-sensitive pad or display. Bus 812 may be any known internal or external bus technology, including but not limited to ISA, EISA, PCI, PCI Express, NuBus, USB, Serial ATA or FireWire. In some embodiments, some or all devices shown as coupled by bus 812 may not be coupled to one another by a physical bus, but by a network connection, for example. Computer-readable medium 810 may be any medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 810 may include various instructions 814 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 may establish and maintain network connections (e.g., software for implementing communication protocols, such as TCP/IP, HTTP, Ethernet, telephony, etc.).

System 100 components 818 may include instructions for performing the processing described herein. For example, system 100 components 818 may provide instructions for performing any and/or all of processes 200-700, and/or other processing as described above. Application(s) 820 may be an application that uses or implements the outcome of processes described herein and/or other processes. In some embodiments, the various processes and/or portions thereof may also be implemented in operating system 814.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112(f).

What is claimed is:

1. A method comprising:
   receiving, by at least one processor, a document including a plurality of sections;
   generating, by the at least one processor, a classification of the document according to at least one of:
      a structure of at least one of the plurality of sections,
      a hierarchy of the plurality of sections, and
      a content of at least one of the plurality of sections;
   determining, by the at least one processor, a chunking strategy optimized for the classification from among a plurality of available chunking strategies;
   dividing, by the at least one processor, the document into a plurality of chunks according to the chunking strategy;
   generating, by the at least one processor, respective vector representations of respective ones of the plurality of chunks; and
   provisioning, by the at least one processor, at least one database comprising the vector representations, wherein the database is configured to supply the vector representations to retrieval augmented generation (RAG) operations performed by at least one large language model (LLM).

2. The method of claim 1, wherein generating the classification comprises:
   identifying, by the at least one processor, a plurality of overlapping data slices within the document;
   extracting, by the at least one processor, at least one data feature within each respective one of the plurality of data slices; and
   detecting, by the at least one processor, at least one boundary between data types within the document according to the extracted at least one data feature, wherein the at least one boundary separates adjacent ones of the plurality of sections.

3. The method of claim 2, wherein the determining comprises selecting, as the chunking strategy, a strategy optimized for the at least one data feature or combination of two or more data features from among the plurality of available chunking strategies.

4. The method of claim 1, wherein generating the classification comprises:
   determining, by the at least one processor, that the document has changed compared with a previously-classified version of the document;
   determining, by the at least one processor, a category of change for the document; and
   selecting, by the at least one processor, a processing action for the document according to the category of change.

5. The method of claim 4, wherein the processing action comprises one of:
   reclassifying, by the at least one processor, the document in response to the category of change indicating a new section in the document;
   tuning, by the at least one processor, a parameter of the chunking strategy in response to the category of change indicating a change at or below a threshold level; and
   changing, by the at least one processor, the chunking strategy to a different one of the plurality of available chunking strategies in response to the category of change indicating a change above the threshold level.

6. The method of claim 1, further comprising identifying, by the at least one processor, the plurality of sections, the identifying of the plurality of sections comprising identifying at least one change within the document, each at least one change indicating presence of respective adjacent sections of the document.

7. The method of claim 1, further comprising annotating, by the at least one processor, at least one of the plurality of chunks.

8. The method of claim 7, wherein the annotating comprises at least one of:
   generating, by the at least one processor, at least one metadata tag according to the classification as an annotation; and
   prompting, by the at least one processor, the at least one LLM with content of the at least one of the plurality of chunks and including at least a portion of an LLM response in an annotation.

9. The method of claim 1, wherein generating the respective vector representations comprises enriching, by the at least one processor, the respective vector representations to include at least one of domain-specific data, semantic data, structural data, and contextual data related to the classification.

10. The method of claim 1, further comprising:
receiving, by the at least one processor, a request for RAG data from at least one of the at least one LLM and at least one computing device preparing a prompt for the at least one LLM; and
responding, by the at least one processor, to the request by sending at least one of the vector representations from the at least one database to at least one of the at least one LLM and the at least one computing device.

11. A system comprising:
at least one processor;
at least one non-transitory memory storing instructions that, when executed by the at least one processor, cause the at least one processor to perform processing comprising:
receiving a document including a plurality of sections;
generating a classification of the document according to at least one of:
a structure of at least one of the plurality of sections,
a hierarchy of the plurality of sections, and
a content of at least one of the plurality of sections;
determining a chunking strategy optimized for the classification from among a plurality of available chunking strategies;
dividing the document into a plurality of chunks according to the chunking strategy;
generating respective vector representations of respective ones of the plurality of chunks; and
at least one database configured to:
store the vector representations;
receive a request for retrieval augmented generation (RAG) data from at least one of at least one large language model (LLM) and at least one computing device preparing a prompt for the at least one LLM; and
respond to the request by sending at least one of the vector representations from the at least one database to at least one of the at least one LLM and the computing device.

12. The system of claim 11, wherein generating the classification comprises:
identifying a plurality of overlapping data slices within the document;
extracting at least one data feature within each respective one of the plurality of data slices; and
detecting at least one boundary between data types within the document according to the extracted at least one data feature, wherein the at least one boundary separates adjacent ones of the plurality of sections.

13. The system of claim 12, wherein the determining comprises selecting, as the chunking strategy, a strategy optimized for the at least one data feature or combination of two or more data features from among the plurality of available chunking strategies.

14. The system of claim 11, wherein generating the classification comprises:
determining that the document has changed compared with a previously-classified version of the document;
determining a category of change for the document; and
selecting a processing action for the document according to the category of change.

15. The system of claim 14, wherein the processing action comprises one of:
reclassifying the document in response to the category of change indicating a new section in the document;
tuning a parameter of the chunking strategy in response to the category of change indicating a change at or below a threshold level; and
changing the chunking strategy to a different one of the plurality of available chunking strategies in response to the category of change indicating a change above the threshold level.

16. The system of claim 11, wherein the processing further comprises identifying the plurality of sections, the identifying of the plurality of sections comprising identifying at least one change within the document, each at least one change indicating presence of respective adjacent sections of the document.

17. The system of claim 11, wherein the processing further comprises annotating at least one of the plurality of chunks.

18. The system of claim 17, wherein the annotating comprises at least one of:
generating at least one metadata tag according to the classification as an annotation; and
prompting the at least one LLM with content of the at least one of the plurality of chunks and including at least a portion of an LLM response in an annotation.

19. The system of claim 11, wherein generating the respective vector representations comprises enriching the respective vector representations to include at least one of domain-specific data, semantic data, structural data, and contextual data related to the classification.

20. A method comprising:
receiving, by at least one processor, a request for retrieval augmented generation (RAG) data from at least one of at least one large language model (LLM) and at least one computing device preparing a prompt for the at least one LLM;
retrieving, by the at least one processor, a plurality of vector representations from at least one database in response to the request, the retrieving comprising executing a plurality of search strategies corresponding to a plurality of data types present in at least one document represented by the plurality of vector representations, wherein the plurality of vector representations have been respectively generated by processing comprising:
receiving a document including a plurality of sections;
generating a classification of the document according to at least one of:
a structure of at least one of the plurality of sections,
a hierarchy of the plurality of sections, and
a content of at least one of the plurality of sections;
determining a chunking strategy optimized for the classification from among a plurality of available chunking strategies;
dividing the document into a plurality of chunks according to the chunking strategy; and
generating respective vector representations of respective ones of the plurality of chunks;
aggregating, by the at least one processor, the plurality of vector representations into an aggregated result; and
sending, by the at least one processor, the aggregated result to the at least one of the at least one LLM and the at least one computing device.

* * * * *